(12) United States Patent
Werner et al.

(10) Patent No.: US 8,583,701 B2
(45) Date of Patent: Nov. 12, 2013

(54) UNIFORM DATA MODEL AND API FOR REPRESENTATION AND PROCESSING OF SEMANTIC DATA

(75) Inventors: Horst Werner, Muehlhausen-Rettigheim (DE); Christof Bornhoevd, Belmont, CA (US)

(73) Assignee: SAP AG, Walldorf (DE)

( * ) Notice: Subject to any disclaimer, the term of this patent is extended or adjusted under 35 U.S.C. 154(b) by 166 days.

(21) Appl. No.: 12/536,681

(22) Filed: Aug. 6, 2009

(65) Prior Publication Data

US 2011/0035391 A1    Feb. 10, 2011

(51) Int. Cl.
*G06F 7/00* (2006.01)
*G06F 17/30* (2006.01)

(52) U.S. Cl.
USPC .......................................................... 707/803

(58) Field of Classification Search
USPC .......................................... 707/E17.014, 803
See application file for complete search history.

(56) References Cited

U.S. PATENT DOCUMENTS

| | | | |
|---|---|---|---|
| 7,613,712 B2 * | 11/2009 | Greenblatt et al. .................. | 1/1 |
| 2003/0066152 A1 * | 4/2003 | Nigh et al. ................... | 15/209.1 |
| 2003/0105746 A1 * | 6/2003 | Stickler ............................. | 707/3 |
| 2004/0230572 A1 * | 11/2004 | Omoigui .......................... | 707/3 |
| 2005/0267871 A1 * | 12/2005 | Marchisio et al. ................ | 707/3 |
| 2009/0063949 A1 * | 3/2009 | Duan ............................. | 715/234 |
| 2010/0318558 A1 * | 12/2010 | Boothroyd .................... | 707/769 |

FOREIGN PATENT DOCUMENTS

WO        03060700         7/2003

OTHER PUBLICATIONS

*ISO/IEC 13250 Topic Maps*, Second Edition, International Standard, Joint Technical Committee 1 (JTC1), Information Technology, May 19, 2002, 50 pages.
*Resource Description Framework (RDF)*, RDF Working Group, Semantic Web Standards, Feb. 10, 2004, http://www.w3.org/RDF, 3 pages.
*Web Ontology Language (OWL)*, W3C Semantic Web, Sep. 6, 2007, http://www.w3.org/2004/OWL, 3 pages.
*Data Modeling Style Guide*, Freebase, http://www.freebase.com/view/en/data_modeling_guide, 6 pages.
*Google Base Data API*, Google Code Labs, http://code.google.com/apis/base/starting-out.html, 19 pages.

* cited by examiner

*Primary Examiner* — Shyue Jiunn Hwa
*Assistant Examiner* — Muluemebet Gurmu
(74) *Attorney, Agent, or Firm* — Fish & Richardson P.C.

(57) ABSTRACT

In some implementations, a method includes receiving a first data set that is stored using a first format, generating an info item based on the first data set, the info item representing an entity extracted from the first data set, generating a delta item based on the first data set, the delta item including a reference to the into item and defining a context-based modification of the info item, generating a second data set in a second format comprising the into item and the delta item, and storing the second data set to the computer-readable storage medium.

17 Claims, 8 Drawing Sheets

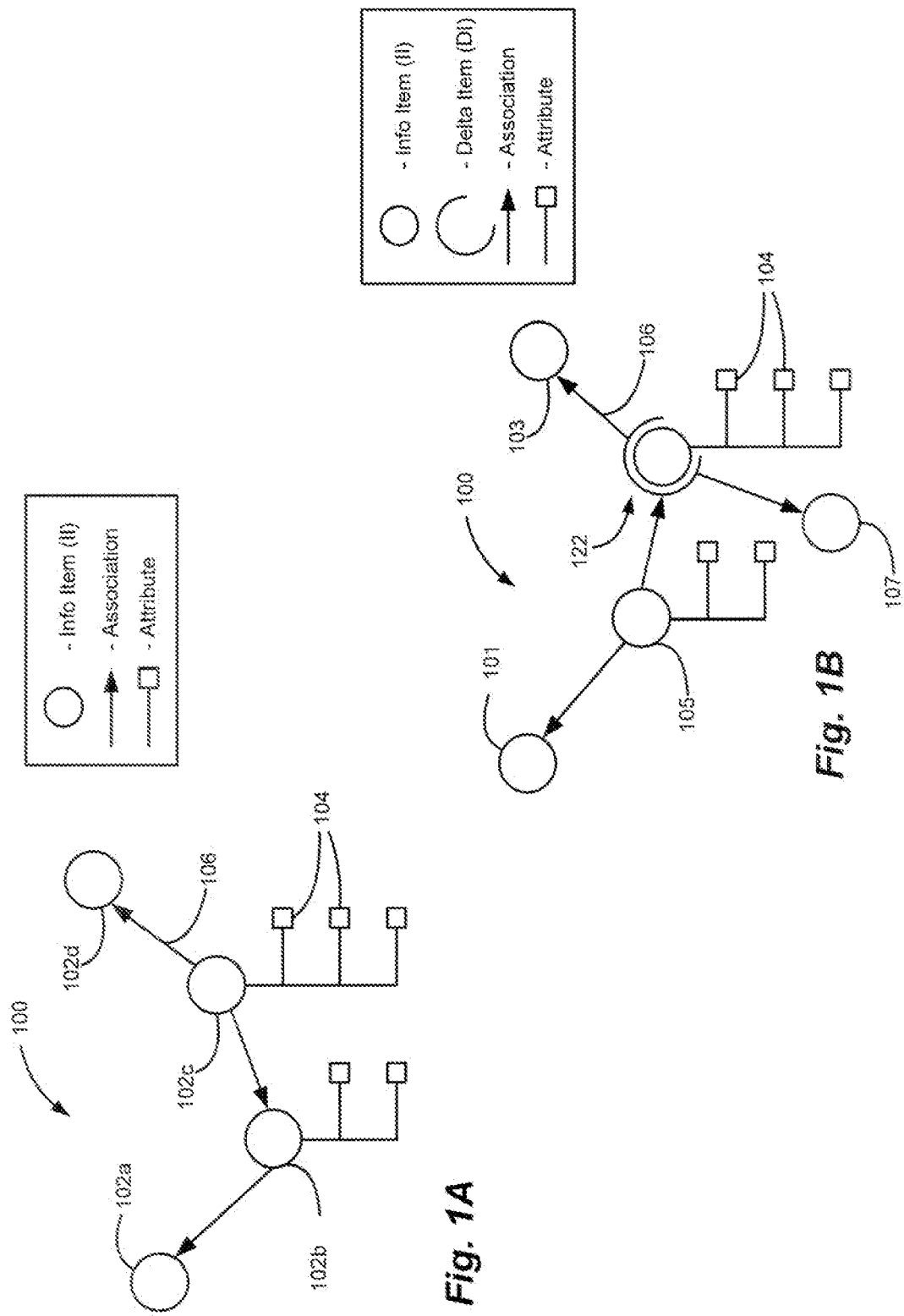

UNIFORM DATA MODEL AND API FOR REPRESENTATION AND PROCESSING OF SEMANTIC DATA

BACKGROUND

Data models typically represent an abstract algorithm for storing, accessing, and representing data. In particular, data models formally define data elements and relationships among data elements for a domain of interest. Typical applications of data models include database models, design, of information systems, and enabling exchange of data. One example of a data model includes a Resource Description Framework (RDF) model. The RDF model is typically used to describe and express metadata regarding web resources and/or represent and exchange (e.g., RDF-XML) semi-structured information. RDF is based on the concept that statements about resources can be made in the form of triples having a subject, a predicate, and an object. For example, an RDF concept may include a triple having a subject (e.g., Joe Simpson), a predicate (e.g., employee of), and an object (e.g., XYZ Inc.). In the RDF object model, the subject represents a resource, whereas the object of such a statement can be either a resource or a literal. This simple concept, with almost no further constraints, offers a very flexible way of modeling information and may depend heavily on what conventions individual applications use to encode and decode RDF data.

Another example of a data model is a Topic Map data model, which is used for the representation and interchange of knowledge, with an emphasis on the "findability" of information. A Topic Map represents information using topics (e.g., concepts, people, countries, organizations, files, events, etc.), associations (i.e., relationships between topics), and occurrences (e.g., information resources relevant to a particular topic). In contrast to RDF, the associations are not triples linking two entities, but rather entities in their own right. The associations represent n-nary associations that assign several involved entities to specific roles. Those roles can be topics on their own, and they can coincide with the respective types of the associated entities.

Another example of a data model is a Freebase data model. The Freebase data model is designed to cope with the fact that different users and usages require different sets of properties for the same entity. This is achieved by allowing users to define their own types and assigning an arbitrary number of types (and thus property sets) to an entity. The properties can be numbers, strings, or references to other entities. For example, "Joe Simpson" as seen through the type "person" has a property "data of birth" with a value of "Feb. 24, 1955." However, "Steve Jobs" as seen through the type "Company Founder" has a property "Companies Founded" with the values "XYZ, Inc." and "Omnicorp" and "ABC, Inc."

SUMMARY

Implementations of methods in accordance with the present disclosure include methods of importing data to a computer-readable storage medium. In some implementations, a method includes receiving a first data set that is stored using a first format generating an info item based on the first data set, the info item representing an entity extracted from the first data set, generating a delta item based on the first data set, the delta item, including a reference to the info item and defining a context-based modification of the info item, generating a second data set in a second format comprising the info item and the delta item, and storing the second data set to the computer-readable storage medium.

In some implementations, an extracted entity includes all data in the first data set and is converted to the second data set without information loss.

In some implementations, data is provided from multiple different data sets, and is represented in the second data set without information loss.

In some implementations, the method further includes providing a property specification associated with the info item, the property specification including an indication of a source info item, an indication of a target info item, and a property type.

In some implementations, the method further includes at least one of setting a property type in the second data set equal to a predicate of the first data set when an object of the first data set comprises a value, and generating a second delta item when the object comprises a resource, wherein the second delta item includes a context-based modification that is set equal to the predicate.

In some implementations, the method further includes generating a second info item based on a topic of the first data set, generating a context item based on an association of the first data set and providing a property of the context item based on a role of the association.

In some implementations, the method further includes providing a list of types of an entity of the first data set, generating a second info item that includes properties of the entity, the properties including common properties, generating a second delta item that includes a property equal to a non-common property of the entity, and generating a context item that includes a property equal to a null property of the entity.

In some implementations, the method further includes exporting the second data set from the computer-readable storage medium, the exporting comprising at least one of generating a resource based on a context-free info item of the second data set, generating a resource based on a delta item of the second data set, and associating a second resource based on a reference to an info item, and generating an association based on a context item of the second data set, and mapping a property type of the context item to a role.

In some implementations, the first format includes one of a resource description framework (RDF) format, a topic map format, and a freebase data format, or a combination of any or all of these formats.

The present disclosure also provides a computer-readable storage medium coupled to one or more processors and having instructions stored thereon which, when executed by the one or more processors, cause the one or more processors to perform, operations in accordance with implementations of the methods provided herein.

The present disclosure further provides a system for implementing the methods provided herein. The system includes one or more processors, and a computer-readable storage medium, coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

FIGS. 1A, 1B, and 1C illustrate exemplar block diagrams of a unified model format in accordance with implementations of the present disclosure.

Like reference symbols in the various drawings indicate like elements.

DETAILED DESCRIPTION

Figure 1C:
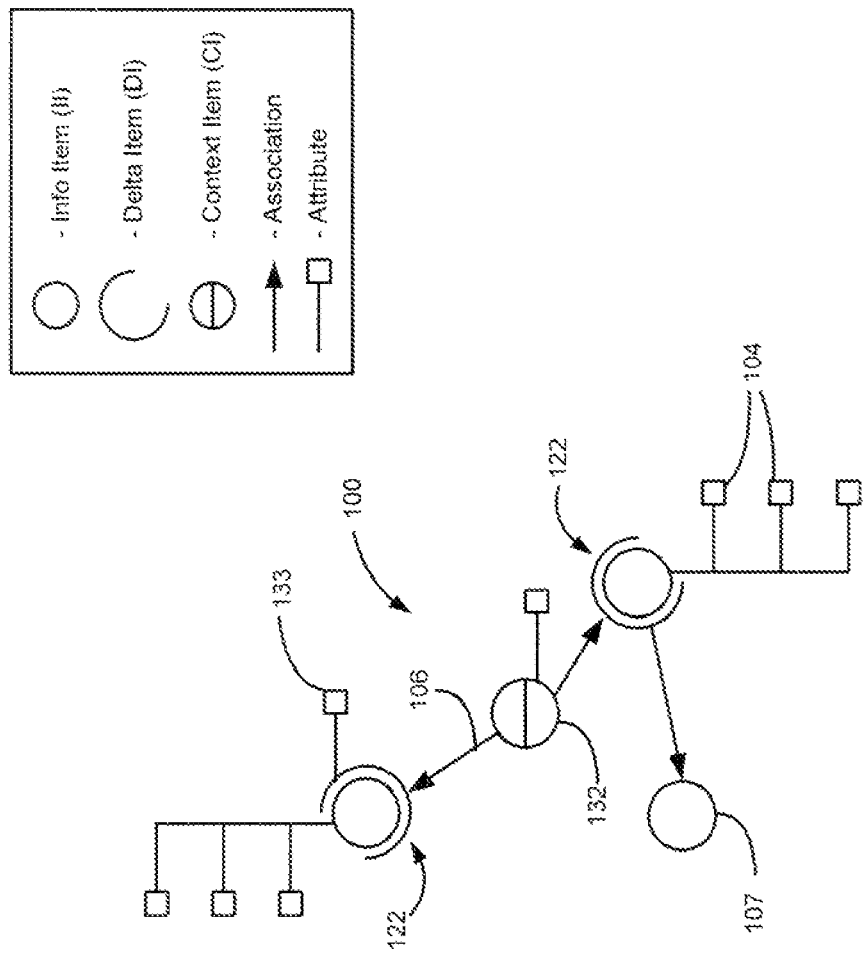

Referring now to FIGS. 1A, 1B, and 1C, block diagrams of a unified data model in accordance with the present disclosure are provided. The unified data model may represent an API (Application Programming Interface) or service that provides an architecture for specifying and manipulating data properties and data associations. In particular, the unified data model defines a meta-model that can be used as a common model for semantic data among multiple, incompatible models including, but not limited to Topic Map formats, semantic web standard formats (e.g., RDF, RDFS, OWL, etc.), and other data model formats (e.g., Freebase). Data formatted in any one of the above-described models or another model can be provided as input into the unified data model, which can be used to exchange and consolidate data between disparate formats.

In general, the unified data model can flexibly assign data (e.g., data properties and data attributes) with semantic metadata. The semantic metadata may provide explicit meaning and data associations. This flexible assignment enables the introduction of abstraction hierarchies that are natively supported by other protocols, and access paradigms to be made compatible with the single, unified data model. For example, type abstraction hierarchies that are natively supported by Resource Description Framework Schema (RDFS) and Topic Maps can be imported into the unified data model and easily understood, transformed, translated, or otherwise manipulated to function within the unified data model. In addition, the unified data model may retain the original integrity of the imported data such that the data can be exported back into a previous data model structure.

The unified data model can also allow polymorphism across platforms where the same entity can have a different set of properties and/or different roles within a data architecture. For example, polymorphism is natively supported by Topic Maps and the Freebase data model, and this functionality can be imported along with Topic Map or Freebase structured data into the unified data model. For example, the unified data model may create delta items for each different role of a particular object and the delta items can all refer to the same (original) Info Item.

In some implementations, the unified data model can import occurrence information or context specific properties (e.g., such as supported in Topic Maps) for a particular data set.

Topic map "occurrences" can be represented by associations to the Info Items which represent the documents where the topics occur. A dedicated association type "occurrence" is used to differentiate the occurrence from other associations. Apart from that, the occurrences can be homogeneously embedded in the information model and can thus be queried like RDF triples if desired.

In operation, the unified data model may include algorithms that provide a homogeneous integration solution to combine data, such as RDF data, Topic Map data, Freebase data, and other model data, into a unified form without information loss. The algorithms may include import algorithms, export algorithms, and consumption algorithms. Consumption algorithms can be used to transform data for the unified data model in such a way that the data can be consumed following any data model identified herein, regardless of the format in which it has been provided. The unified data model can be represented in a quadruple schema having a subject, a context, a predicate, and an object. The subject represents a resource, whereas the object of such a statement can be either a resource or a literal. The context covers both the expressiveness of an "association," as in Topic Map data models, and the expressiveness of the "type," as in Freebase data models. The predicate represents a role that can be defined in the local scope of an association type.

The use of a quadruple schema enables the import of information from several different data, models without destroying each model's native character. As an example, any Into Items imported from one of the aforementioned formats (e.g., RDF, Topic Map, Freebase) may be missing one or more components used to create the four components in the data model. In particular, in the RDF data model, the context value is missing; in the Topic Map data model, the predicate is missing; and in the freebase data model, the context is confined to the association of an Info Item to a specific role (e.g., in the sense of an interface in Object Oriented Programming). The model information can be combined to create the quadruple schema components.

The concept of a partially filled quadruple schema allows for a lossless recreation in the native form of an Info Item at any time, and also allows for access to the information in different paradigms. The quadruple data structure provides a powerful information structure since it can represent modifications of an Info Item, instance in the context of an association to a second Info Item.

In some implementations, the algorithms may include processes to model n-nary associations from a Topic Map model, in an RDF model, or a Freebase model. For example, to model an n-nary association from a Topic Map in RDF or in Freebase, an algorithm may introduce an artificial entity "employment tenure," with triples or properties pointing to the respective involved entities. More particularly and as a specific example, the process of finding a number of employees of "XYZ, Inc." may involve navigating along an employment tenure "node." Next, to integrate RDF data where a direct relationship between employers and employees is represented by simple triples, an algorithm can employ both mechanisms (e.g., navigating directly along a simple association and indirectly along an intermediate "employment tenure" node) to ensure that all information is captured in the new data model.

With particular reference to FIGS. 1A, 1B, and 1C the unified data model 100 employs so-called Info Items 102a, 102b, 102c, and 102d, attributes 104, associations 106, Delta Items 122, and Context Items 132. Each Info Item represents entities and properties that associate attribute values or other Info Items to other items and/or properties in the architecture.

For example, a first Info Item 102 may be associated with a second Info Item 102d, and attributes 104. Info Items are the unit of retrieval, extraction, and correlation of data. An Info Item provides a single uniquely identifiable data instance that has an assigned set of properties, which can either associate one or multiple values of built-in representation types to the Info Item, or which represent relationships between the Info Item and other Info Items. Info Items can be assigned a type label (e.g., a Term) that indicates the assumed item class of the Info Item.

The properties represented by Info Items can be specified by a "source" Info Item (e.g., corresponding to the RDF "subject" property), a property type, and a "target" Info Item (e.g., corresponding to an RDF "predicate" property), or a value (e.g., a string, a Boolean, or a number). For example, the Info Item 102a may represent a "source" Info Item instance to a "target" Info Item instance 102d. Optionally, the properties may be represented by the identification of a specific context in which the property is valid. With particular reference to FIG. 1B, a Delta Item 122 can be referred to by a particular Info Item 105 providing a context to the Delta Item 122. In this case, the Info Item 105 is a contextual Info Item. In some implementations, Info Items can be context-free Info Items.

The property type specifies a particular role of the target Info Item with respect to a referring Info Item. The property type can be the same type as an associated, Info Item's type. That is, there may be no difference between a property type and an Info Item type. In the case of attributes (e.g., strings or numbers), the property type specifies the type (i.e., the intended meaning) of the associated value. Attributes 104 may include information about the Info Items 102 including, but not limited to name, location, address, personal employee information, priority, status, assigned tasks, role, project details, etc. In some implementations, attributes can be introduced after a particular attribute has been assigned. For example, the Delta Item 122 can introduce a priority attribute 133 and assign the priority of a particular project to "high."

Referring to FIG. 1A, the Info Item 102c represents a person (e.g., Joe Simpson) having a number of attributes 104 such as name, office location, employee ID, etc. The "Joe Simpson" Info Item 102c is of the type "person" Info Item 102d and is a member of an "Engineering Group" Into Item 102b, for example. The "Engineering Group" Info Item 102b may includes several attributes such as head count, group budget, building number, etc. The "Engineering Group" Info Item 102b is represented as part of a particular "Hardware Department" Info Item 102a, for example, which, although not depicted in FIG. 1A, may also include a number of associated attributes.

In this example, if the person "Joe Simpson" is the source of an Info Item, the property "employer" is the property type, and the "Engineering Group" is the target Info Item. The unified data model 100 can include additional information about the employment relationship between "Joe Simpson" and the "Engineering Group," including, but not limited to, job function, start date, end date, pay rate, project status, or vacation balance. However, because the same properties may pertain to multiple sources of Info Items, the unified data model 100 can represent a specific "context" for the properties. For example, the unified data model 100 introduces a Delta Item 122 to represent the context of a property relating to the Info Item 103. The Delta Item 122 represents context-specific modifications of Info Items. A Delta Item generally belongs to one context and can add properties to the original "context-free" Info Item, overwrite properties of the original "context-free" Info Item, and hide properties from the original "context-free" Info Item.

Referring to FIG. 1B, the Delta Item 122 may specifically represent the person "Joe Simpson" in the context of a "Project Name" Info Item 105. That is, the diagram shows that "Joe Simpson" (122) is a member of a particular project having the project name "Web 7.0" (105). The "Web 7.0" Info Item 105 is of the type "Project" Info Item 101. In addition, the Delta Item 122 can be used as context for assigning "Joe Simpson" to an "Expert" Info Item 103 such that the system understands "Joe Simpson" to be an "Expert" for the "Web 7.0" project. Furthermore, a deliverable Info Item 107 may be used to assign an "Expert Opinion" deliverable to "Joe Simpson."

In general, Delta Items store a reference to an original Info Item as well as any modifications performed on the Info Item. However, from an external source, the Delta Items represent the modified Info Item. That is, the unified data model merges the original properties with the modifications if, for example, an external request is received asking about Info Item properties. As such, if the context is considered as a situation-specific view on an entity, the role in Topic Map and the predicate in RDF can also be seen as the type of the referred item in the context of the reference (e.g., "Joe Simpson" has the type employee in the context of a reference from "Engineering Group" to him). Thus, the reference already specifies a context with a modification of the referred item, in which its type is changed.

In some implementations, a Delta Item may be a situation specific view of a particular Info Item. For example, a "person" Info Item (context free) may include attributes such as age, social security number, and home address. The "person" Info Item can include two Delta Items. For example, a first Delta Item may be an "Employee" Delta Item which provides a work-related view on the "person" Info Item providing work-related attributes including, but not limited to salary, phone number, and office location. An association can be made to the Employee Delta Item, such that certain attributes of the original "person" Info Item are hidden. For example, an employer may view information about an employee such as salary, but may not have access to human resources related data such as age, marital status, etc. A second Delta Item may be a "Father" Delta Item which provides a family oriented view on the Person item providing among others the additional link to another "child" item (which in turn could be a Delta Item for another "person" Info Item).

In some implementations, property names may be identical to type names. In a Freebase model, polymorphism allows for one entity to have a different set of properties within one data architecture. For example, a person can be referred to as an author of a book. This person is of the type "author," where author also includes properties such as "works written," "school," or "movement," for example. Therefore, a type-specific view on an Info Item may be a special case of a "context" regardless of the involvement of further Info Items. The reference to an Info Item with a reference-specific type (e.g., role or predicate) already defines a context, and by associating the type-specific properties to this context, the unified data model 100 can provide the advantage of seamlessly embedding Freebase polymorphism.

At a high level, the unified data model implements an access paradigm that exposes data imported from a data model in a homogeneous and consistent way, while preserving the data model's native structuring paradigm in the new unified data model 100. The unified data model also provides one or more APIs to implement features thereof. For example, the unified data model may include a data access and manipulation API that implements the core building blocks including Workspaces, Info Items, Associations, Templates, and the basic operations for each block.

The Workspace represents an entity where Info Items are collected. Workspaces provide a default scope for the querying and manipulation of Info Items and their Associations. Workspaces allow the persistent storage and the export of sets of Info Items in different formats.

With particular reference to FIG. 1C, a Context Item 132 can assign different properties to different occurrences of the same object even if the role is the same. In general, the Context Item 132 may provide the context for multiple Info Items and may also provide the context for n-nary relationships between Info Items. For example, the same person (e.g., John Carpenter in Table 1 below) can participate in different projects or roles and have different deliverables (e.g., (i) decision on $3^{rd}$ party tool (ii) determine member tasks). Therefore, the n-nary association concept of Topic Maps can be integrated into the unified data model 100. By way of non-limiting example, a list of people involved in a project "Mega Buzz 2010" is illustrated in Table 1 below. In this example, the deliverable column represents a property of the responsible member column. Consequently, the member column may have a binary association to the deliverable column, although, Table 1 may provide a list of n-nary associations.

TABLE 1

Project Contributor List

| Role | Member | Deliverable |
| --- | --- | --- |
| Project Lead | John Carpenter | Decision on 3rd party tool |
| Consultant | John Carpenter | Determine Member Tasks |
| Consultant | Max Payne | List of use cases |
| Developer | Joe Simpson | UI |
| Developer | Matt Jones | Server components |

In the same non-limiting example, a list of projects for one member above (e.g., Joe Simpson) is shown in Table 2 below. Here, it is intuitive to consider the role and deliverable as a property of the respective project. In Freebase, RDF, and Topic Maps, however, the models would create an entity/association of a type "contribution" to represent these n-nary associations. In this case, to determine the deliverables of "Joe Simpson" in the Project "Mega Buzz 2010," the model can first query for the contributions where the "Member" is "Joe Simpson," and the "Project" is "Mega Buzz 2010." In the RDF and Freebase example, the models may also navigate from "Joe Simpson" along a property "contributions." The models may then pick only the contributions to Mega Buzz 2010 to obtain the associated deliverables from these contributions.

TABLE 2

Project List

| Project | Role | Deliverable |
| --- | --- | --- |
| Mega Buzz 2010 | Developer | UI |
| Web 7.0 | Expert | Expert Opinion |
| Crabb 2.0 | Developer | Connector module |

In the unified data model, the roles and deliverables are typically exposed as context specific properties of both the projects and the people. In the unified data model, the context itself is also represented by an Info Item (i.e., a Context Item) and instead of associating the deliverable redundantly to both involved Delta Items, the model assigns the deliverable to the Context Item. In addition, in the event that a Delta Item is asked for its properties, the unified data model merges the properties of the original item with its own modifications and merges with the modifications of the corresponding Context Item, if such modifications exist. That is, the Context Item takes on the "role" of a cascaded Delta Item for any of the entities involved in an n-nary association and exposes the additional properties as if they belonged to this entity. This "type cast" of the context is implicitly done by accessing a specific Delta Item associated the context. In cases where all context specific modifications are supposed to be visible for all involved entities, separate Delta Items for these entities may not be necessary since the associations are set up to point to the original Items and the Context Item.

In some implementations, the underlying application accessing the unified data model need not differentiate between a simple binary association and a context. For example, in the case where data about a first project has been imported from an RDF model and a Topic Map model. In particular, the RDF model may contain a triple "Mega Buzz 2010," "Member," "Phineas Fogg," and the Topic Map may contain an association "Project: Mega Buzz 2010, Member: Matt Jones, Role: Developer, Deliverable: Server Components." The unified data model can operate by sending a request to a "Project" instance for all Items that are associated via the property "Member." The response will be an Info Item representing "Phineas Fogg" and a Delta Item representing "Matt Jones." The difference here is that, according to the available information, "Matt Jones" may have the context-specific properties of "role" and "deliverable" whereas "Phineas Fogg may only have context-free properties, such as "date of birth" and the like.

In some implementations, the unified data model may also provide an access paradigm that allows developers to employ the unified data model without undue data conversion complexity. The access paradigm can be implemented by providing local or web service APIs for the data model aspect and the core operations functioning on the data model.

The access paradigm ensures that wherever an Info Item is referred to as associated to another Item or with a different type, the Delta Item that belongs to the corresponding context is retrieved or created, so that any modifications of the returned Item do not affect the original Info Item, but only its contextual representation. As such, by default, the modifications can be assigned to the Context Item so that they can appear as properties of all involved Info Items. To assign a modification to a specific Delta Item within the context, the corresponding Item is explicitly addressed. The following exemplar pseudo-code provides for adding a context-free deliverable and prioritizing the deliverable for a particular member:

```
megaBuzz_2010.add("Member", "Phineas_Fogg");
matt_as_member = megaBuzz_2010.add ("Member", "matt_jones");
matt_as_member.set("Role", "developer");
deliverable1 = Matt_as_member.add("Deliverable",
"server_components");
// set priority of deliverable (only in scope of context)
deliverable1.set("priority", 5);
// now define a context-independent deliverable
deliverable2 = new Deliverable("maintain_time_recording");
// set priority of deliverable
deliverable2.set("priority", 7);
getEntitiy("Person","matt_jones").add("Deliverable", deliverable2);
```

In some implementations, the access paradigm allows switching between contexts and context-free Info Items. For example, a reference to an Info Item may be retrieved via an association when global changes are waiting to be performed on the Info Item. In this scenario, the unified data model can support a command for the explicit casting of a context-free Item. Similarly, the model can provide a command for listing all contextual (Delta) Items belonging to a given Info Item.

In some implementations, the unified data model provides a REST-ful based implementation of the access paradigm. In other implementations, the unified data model provides a native Java-based implementation of the access paradigm.

Figure 2A:
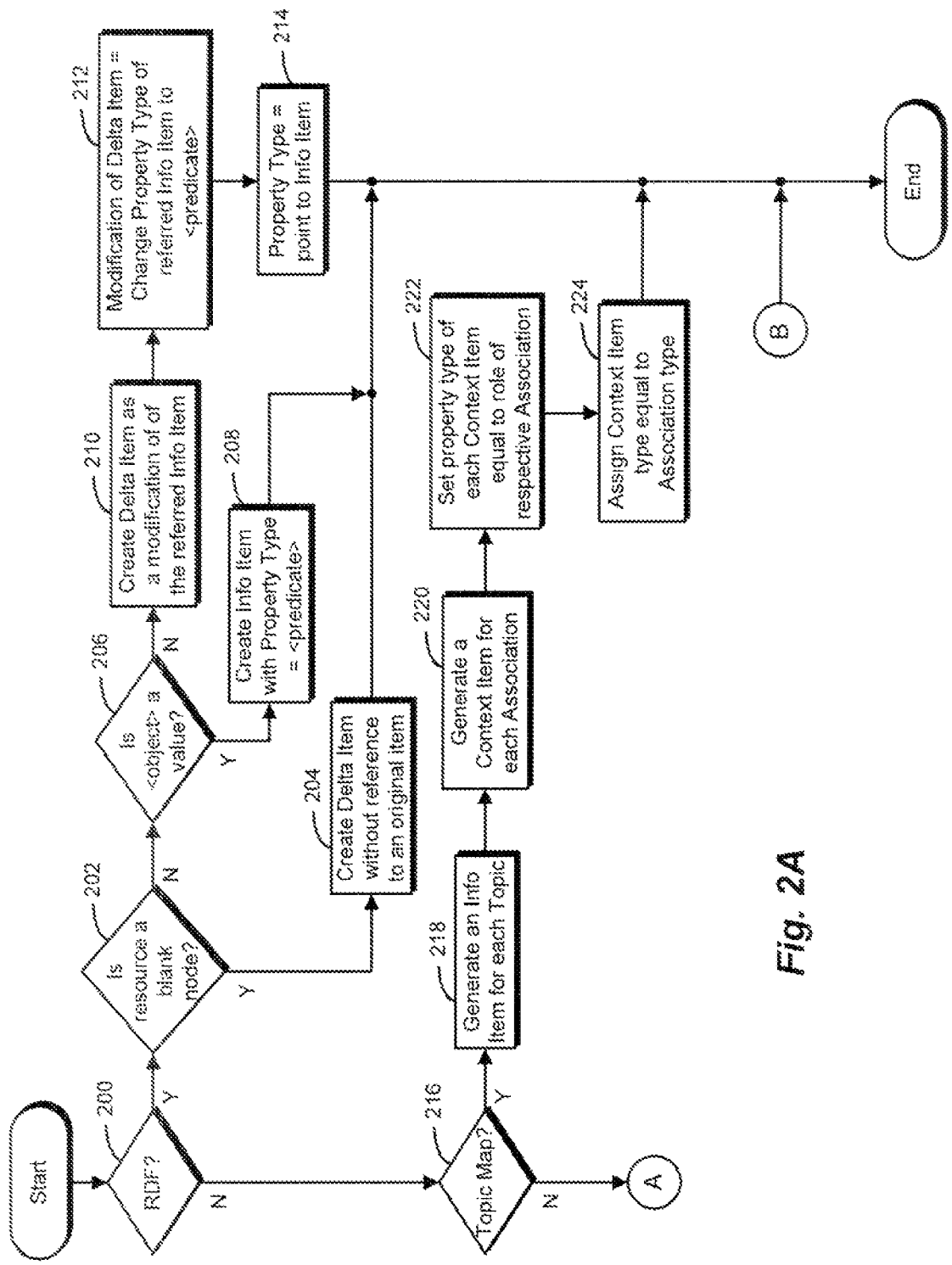
FIGS. 2A and 2B provide a flowchart illustrating exemplar steps that can be executed to import data from one format into the unified format of the present disclosure.
Figure 2B:
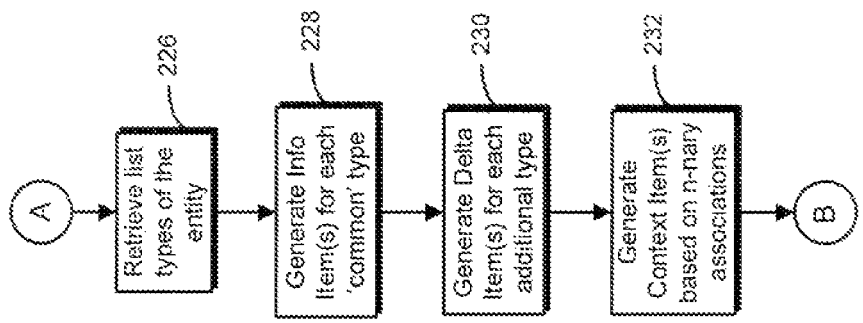

Referring now to FIGS. 2A and 2B, a flowchart illustrates exemplar steps that can be executed to import data from one format into the unified data format. Briefly, the steps include receiving a first data set that is stored using a first format, determining the format of the received data, extracting object and property information, generating Delta Items, and updating Info Items. The received data can be a triple that can be transformed into a property.

In step 200, it is determined whether a received data set is in the RDF model format. For example, it can be determined whether a particular resource in a received data set corresponds to an Info Item in the unified model. In general, the unified data model can be used on data imported from an RDF model. For example, the properties of an Info Item can be retrieved by specifying the resource (e.g., Info Item) identifier and a property type. If the associated Item is a Delta Item, the original Item is identified and returned, since RDF does not know the concept of occurrence-specific type or properties.

If it is determined that the received data set is not in the RDF format, the steps continue in step 216. If it is determined that the received data set is in the RDF format, it is determined whether a referred resource is a blank node in step 202. A blank node represents an anonymous resource which is not identified by a Uniform Resource Identifier (URI). Typically, a blank node can be used as a subject or an object in an RDF triple. A blank node can be used to indirectly attach to a resource a consistent set of properties that together represent complex data, such as a postal address. The different fields of the complex data are represented as properties attached to the blank node. If the referred resource is a blank node, the process creates a Delta Item without reference to the original item in step 204, and the steps end. The created Delta Item has no URI and no context-free representation.

If however, it is determined that the resource is not a blank node, it is determined whether an object in a triple has a value in step 206. If the object has a value, an Info Item is created in step 208 with the predicate as its property type. For example, a property "employer" can be linked to a subject "person," which can be linked to an object "organization." In short, the property "type" of the Info Item can be set equal to a predicate when an Info Item contains a value.

If the resource is not a blank node and the object does not have a value, a Delta Item is created in step 210 as a modification of the referred resource (e.g., Info Item). This changes the Info Item type to the predicate of the triple. In short, the process generates a Delta Item that includes a context-based modification that is set equal to the predicate (e.g., property).

In step 212, a modification of the Delta Item is performed. For example, the property "type" of the Delta Item (e.g., referred resource Info Item) can be changed to the predicate of the triple. In step 214, the property of the referring Info Item is created. The property points to the Delta Item. At the same time, an inverse association from the referred resource (e.g., Info Item 102) to the referring resource (e.g., another Info Item 102) can be created. The property type of this inverse association may be defined by a schema or rule. In the event that no schema or rule exists, the definition can default to the type of the referring resource.

In step 216, it is determined whether the imported data set is in the Topic Map format. Typically, a Topic Map-style request contains the Topic Map association type, known role or value pairs and the requested roles (e.g. "written-by", Author: Leo Tolstoy, Book:?). When a Topic Map is imported, each "topic" is represented by an Info Item. Consequently, in step 218, an Info Item is generated for each topic in the received data set. In step 220, a Context Item is generated for each association. The Context Item represents roles and deliverables as context specific properties of a particular topic, person, or project. The Context Item is a type of Info Item. Instead of associating the deliverable redundantly to one or more involved Delta Items, the information can be assigned to a Context Item. For each role in the association above, a property of the Context Item can be created where the respective role takes the place of the RDF predicate. In step 222, the property "type" of each Delta Item associated to the Context Item is set equal to the role of respective Topic Map association. In step 224, the Context Item itself is assigned to a type which corresponds to the Topic Map association type.

Properties that originate from a Topic Map "assignment node" naturally fall into place, because the created Context Item takes the role of the n-nary association in a Topic Map. Properties of an ordinary Info Item are made accessible to this kind of query. In one example, for the known part of an association, the role is interpreted as the contextual type of the known Info Item. As such, a Delta Item pointing to the entity "Leo Tolstoy" with the type "Author" can be found. For this particular Info Item, the properties are evaluated. The properties include the property type or the type of the referenced Info Item that matches the requested role. Here, the Topic Map association type does not need to be specified. This approach works reliably because for every property, an inverse property and thus a pair of Delta Items can be maintained. Consequently, each of the two Delta Items has the respective contextual type from the perspective of the other involved Info Item, and the two Delta items correspond exactly to two roles with values in a native Topic Map association.

Referring now to FIG. 2B, if it is determined that the received data set is not in the Topic Map model in step 216, list types of the received entity are retrieved in step 226. The list types may be used to import one or more Freebase formatted entity. In step 228, an Into Item is generated for each instance of a topic with a "common" type. Freebase subjects are called topics, and the data stored about the topics depends on the topic type (e.g., how they are classified). For example, an entry for California's governor, Arnold Schwarzenegger, would be entered as a topic that would include a variety of types describing him as an actor, an athlete, and a politician. Users can create their own types, but these types are not typically adopted as "common" types until promoted by an internal system administrator, for example.

In Freebase, each type includes a number of defined predicates knows as "properties." In step 230, one or more Delta Items is generated for each additional type present in the received data set. Each Delta Item can contain the properties of the respective type. When a property is imported, the property type is set to the corresponding Freebase property type and—in contrast to the RDF and Topic Map import—the type of the Delta Item it points to can differ from the property type (although it is typically similar, e.g. there is a Freebase property type "author" pointing an item of type (or "interface") "/book/author"). In step 232, one or more Context Items is generated based on n-nary associations. An n-nary association in Freebase, which can be identified by the fact that its "/topic/name" property is "null," is transformed into a Context Item, similar to the way a Topic Map association is transformed, but again the types of the Delta Items are not identical with the property types, but rather retrieved from the Freebase metadata.

At some point, the received data set, the generated Info Items, Delta Items, and Context Items, the associations, and the properties can be stored in a system for future use. Namely, the above entities can be combined and stored to produce a metamodel, such as the unified data model, which receives, translates, and processes information from an RDF model, a Topic Maps model, a Freebase model, and other data models.

In some implementations, an Info Item can be queried with a specific type that may cause a corresponding Delta Item to be selected. If this Delta Item is referred by an n-nary association (either imported from a Topic Map or created as "assignment node" in Freebase), any request for properties may first search for properties of the original item, and may add the context item properties, and finally modify the properties according to the information contained in the Delta Item. As a result, properties that have been defined in an n-nary association can appear as properties of any one of the associated Info Items.

Figure 3A:
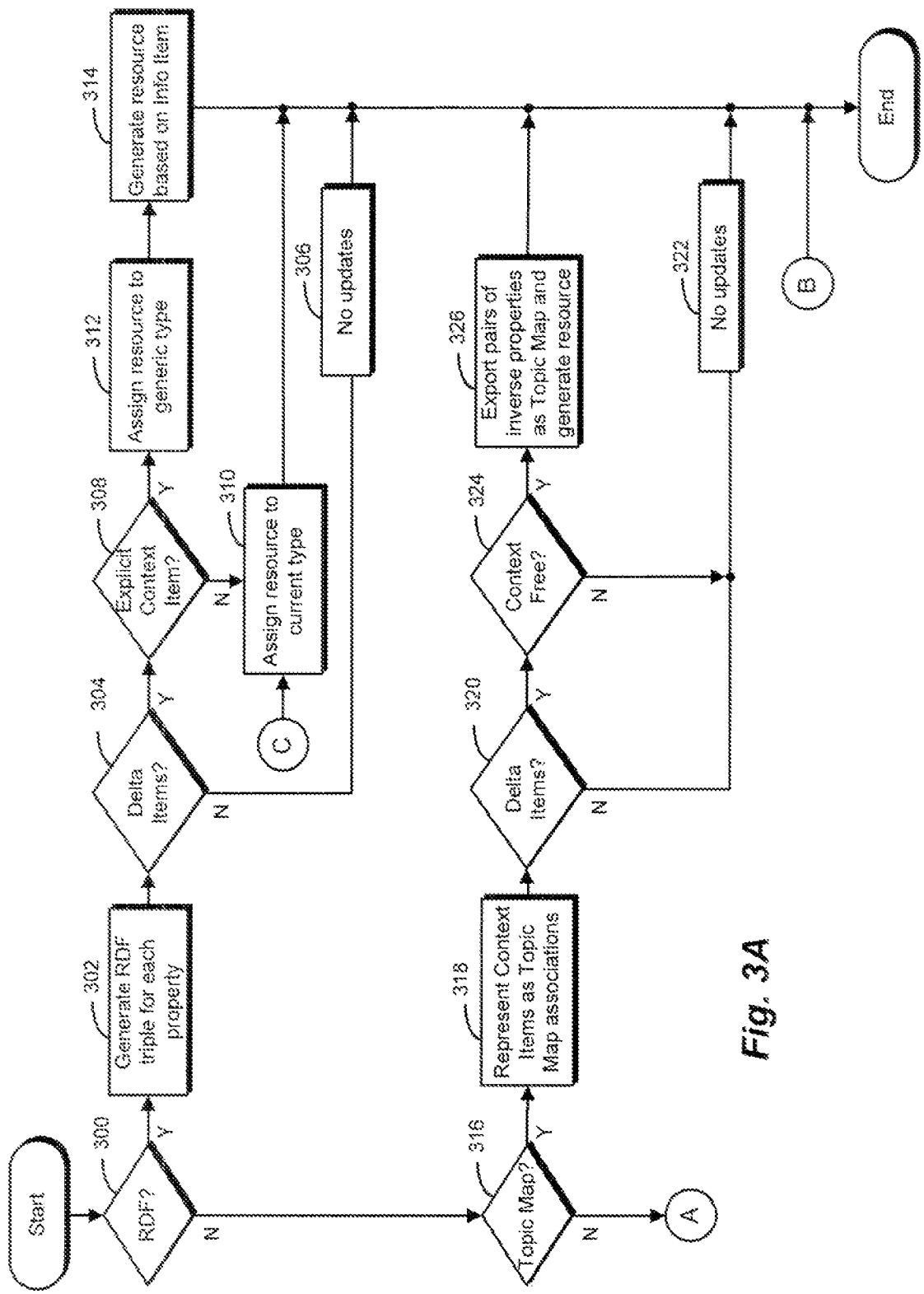
FIGS. 3A and 3B provide a flowchart illustrating exemplar steps that can be executed to export, data from the unified format of the present disclosure to another format.
Figure 3B:
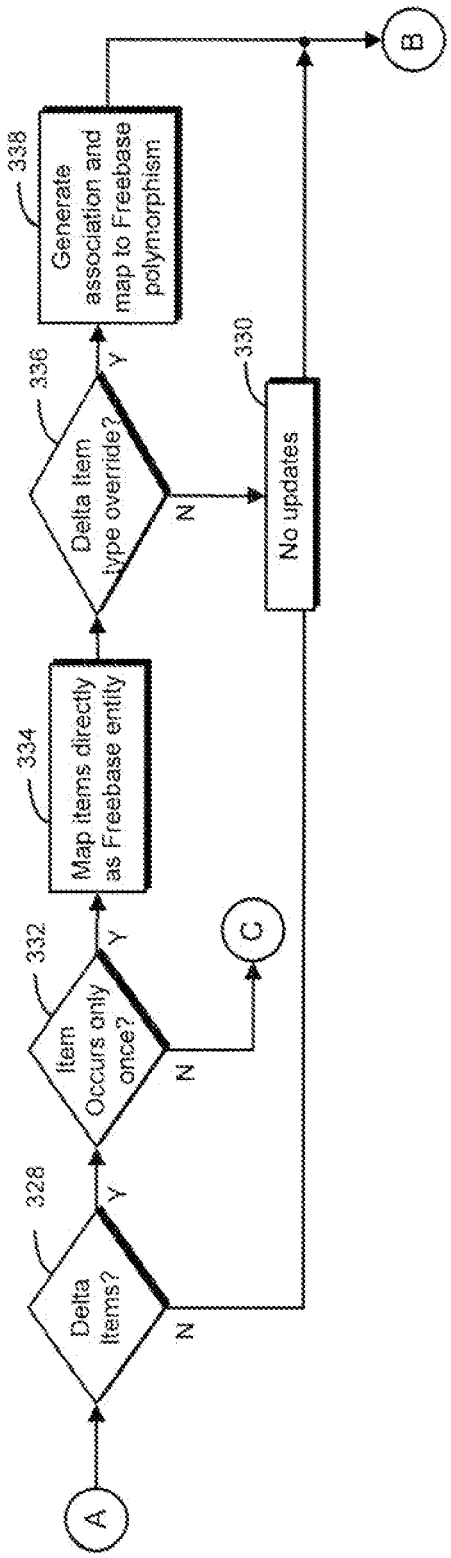

Referring now to FIGS. 3A and 3B, a flowchart illustrates exemplar steps that can be executed to export data from the unified format to another format. Briefly, the steps include generating resources and/or associations based on a context-free Info Item, a Delta Item, or a Context Item and mapping property types accordingly.

In step 300, it is determined whether a data set is to be exported in the RDF model format. If the data set is in the RDF model format or other similar format, the process generates an RDF triple for each available property in a context-free Info Item. In step 302, the process determines if there are Delta Items available for one or more Info Items. If no Delta Items exist, the process does not perform updates, as shown in step 306. If the process determines that Delta Items exist, the process creates an own resource and associates the resource to the original Info Item with "same as" association label, in step 310. In step 308, the process determines if there is an explicit context item linking all involved Delta Items. If there is an explicit context item linking all involved Delta Items, the context item is treated as its own resource. If no other type is specified for the context item, the process can assign a resource with a generic type assignment, in step 312. In the event that a received Delta Item has no own URI, the Delta Item may be represented by a blank node. In step 314, the process generates a resource based on the context-free Info Item.

If the received data set is not in the RDF model format, in step 316, the process determines whether an imported data set is in the Topic Map model format or other similar format. If the process determines that the received data set is in the Topic Map model format, the process can represent the Context Items as Topic Map associations, in step 318, where the property types of the Context Items are mapped to roles in the Topic Map. In step 320, the process determines if there are Delta Items available. If there are no Delta Items available, the process does not perform updates, as shown in step 322.

In step 324, the process determines if the Info Items are context-free. If the Info Items are context-free, the process exports each pair of inverse properties as a Topic Map association (e.g., "author" and "books written") and generates a resource based on the Delta Item, in step 326. For delta items, the corresponding Context Item is mapped to a Topic Map association (e.g. employer "Apple, Inc." and employee "Steve Jobs, employment tenure").

Referring now to FIG. 3B, the process determines whether the received data set includes Delta Items, in step 328. If no Delta Items exist within the received data set, the process does not perform updates, as shown in step 330. If Delta Items do exist within the received data set, the process determines whether the Items occur only once in the specified type, in step 332. If the Items occur more than once, the process returns to step 310 (FIG. 3A) and assigns resources to the current type. Info Items which have several context-specific Delta Items with the same role may be assigned in the same manner as for an RDF export. If, however, the Items occur only once, the process can map the Items directly as Freebase entities, in step 334.

In step 336, the process determines with one or more Delta Items override a particular type. If the Delta Item does not override a particular type, the process does not perform updates, as shown in step 336. If the Delta Items does override a type, the process can generate an association based on a Context Item and map a property type of the context item to a role using polymorphism principles. For example, Delta Items that override the type, but only occur once for each given type, can be mapped to Freebases' polymorphism principles.

Figure 4:
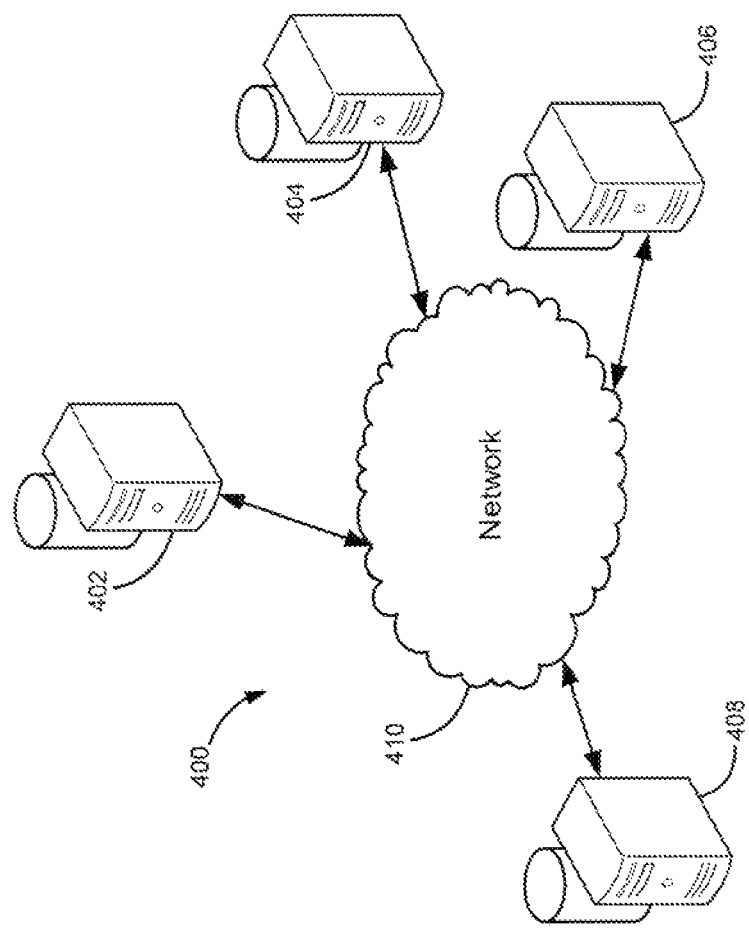
FIG. 4 is a block diagram of an exemplar architecture that can execute implementations of the present disclosure.

Referring now to FIG. 4, a block diagram illustrates an exemplar architecture 400 that can execute implementations of the present disclosure. The architecture 400 may represent a service system that provides unified data modeling for seamlessly integrating RDF data, Topic Maps data, Freebase data, and other model data into a unified form without information loss. The architecture 400 may also provide an access paradigm that allows developers to employ the unified data model without undue data conversion complexity. The access paradigm can be implemented by providing local or web service APIs for the data model aspect and the core operations functioning on the data model. The architecture 400 may include multiple servers 402, 404, 406, and 408 communicating across a network 410. The systems 402-408 can be modeled as a database and/or server system including a database, which abstracts data from other functions throughout application software installed on the systems 402-408.

System 400 is typically a distributed client/server system that spans one or more networks such as network 410. In such cases, the various components—such as server systems 402—may communicate via a virtual private network (VPN), Secure Shell (SSH) tunnel, or other secure network connection. Accordingly, rather than being delivered as packaged software, system 400 may represent a hosted solution that may scale cost-effectively and help drive faster adoption. In this case, portions of the hosted solution may be developed by a first entity, while other components are developed by a second entity. In such embodiments, data may be communicated or stored in an encrypted format using any standard or proprietary encryption algorithm. This encrypted communication may be between the user (or application/client) and the host or amongst various components of the host. Put simply, communication or other transmission between any modules and/or components may include any encryption, export, translation, or data massage, compression, and so forth as appropriate. Further, system 400 may store some data at a relatively central location (over a WAN) while concurrently maintaining local data at the user's site for redundancy and to allow processing during downtime. But system 400 may be in a dedicated enterprise environment—across a local area network (over LAN) or subnet—or any other suitable environment without departing from the scope of the present disclosure.

The techniques and components described herein may be implemented within an Enterprise Service Architecture (ESA) environment, often termed a Service Oriented Architecture (SOA). In certain implementations, SOA can be considered a blueprint for an adaptable, flexible, and open architecture for developing services-based, enterprise-scale business solutions. The respective enterprise service is typically a series of web services combined with business logic that can be accessed and used repeatedly to support a particular business process. Aggregating such web services into business-level enterprise services may provide a more meaningful foundation for the task of automating enterprise-scale business scenarios. The composite application framework comprises rules framework, design tools, methodologies, services and processes, an abstraction layer for objects, and user interface and process pattern libraries. The composite application framework supports model-driven application composition, so a user may build applications and/or implement supply chain policies with as little programming as possible, which often results in reduced development and deployment time for new/modified applications and business-pattern-oriented integration.

Figure 5:
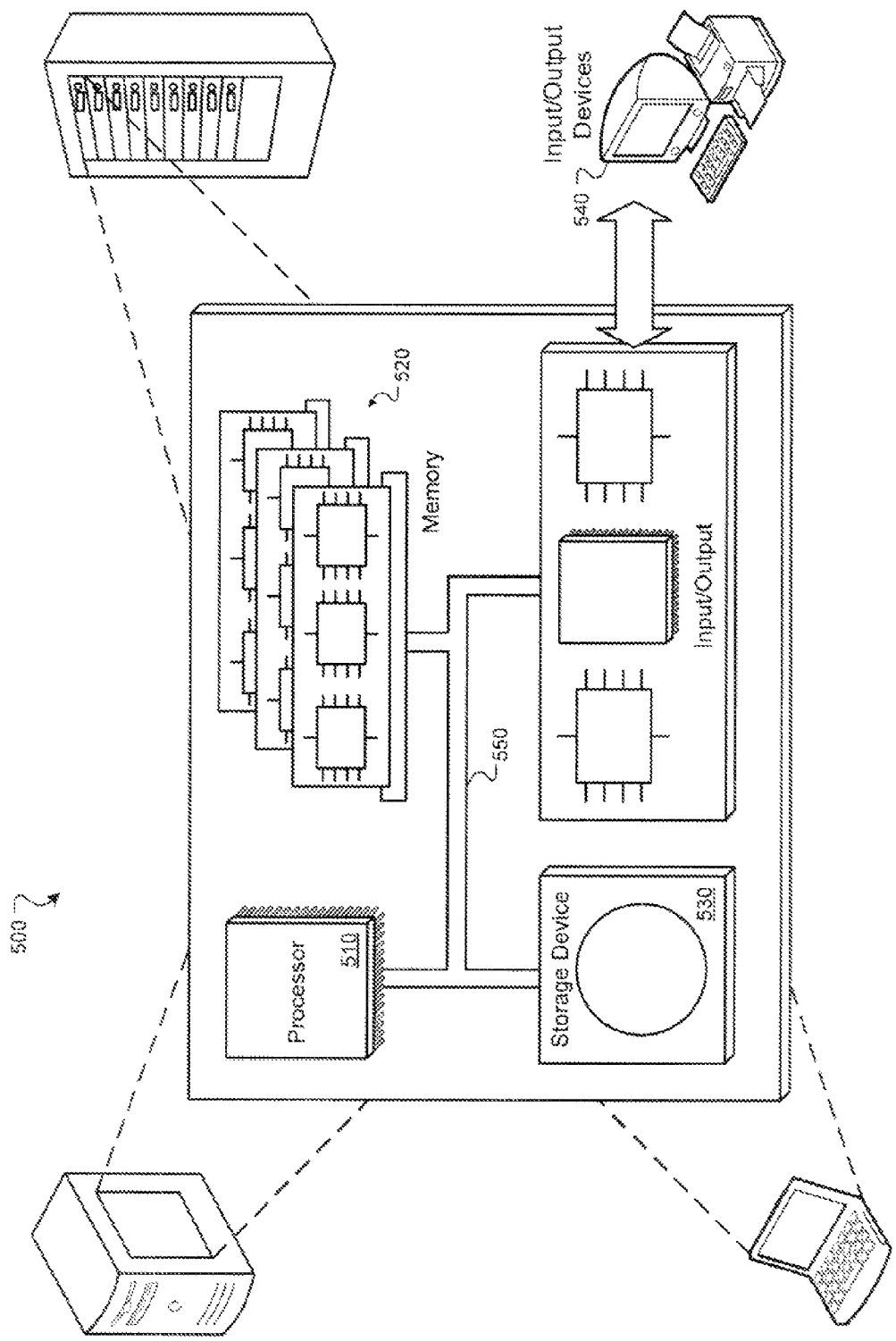
FIG. 5 is a schematic illustration of exemplar computer systems that can be used to execute implementations of the present disclosure.

Referring now to FIG. 5, a schematic diagram of an exemplar computer system 500 is provided. The system 500 can be used for the operations described in association with the methods described in FIGS. 2A-3B according to one implementation. For example, the system 500 may be included in any or all of the server components 402, 404, 406, or 408. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A method of importing data to a computer-readable storage medium, comprising:
receiving a first data set provided in a first format corresponding to a first data model; and
processing the first data set to generate a second data set provided in a second format corresponding to a second data model, the first data model being incompatible with the second data model, wherein processing the first data set comprises:
transforming the first data set to a third data set provided in a third format corresponding to a unified data model, the third format comprising a quadruple schema including subject, context, predicate and object, the unified data model comprising source info items, target info items, delta items and context items, transforming comprising:
generating a source info item based on the first data set, the source info item representing an entity extracted from the first data set, the source info item associated with two or more attributes;
generating a delta item based on the first data set, the delta item including a reference to the source info item and a context-based modification of the source info item;
performing the context-based modification of the source info item;
in response to performing the context-based modification, setting a property type of the source info item to point to the delta item, wherein the delta item is associated with a subset of the attributes; and
storing the third data set to the computer-readable storage medium; and
generating the second data set based on the third data set by exporting the third data set from the computer-readable storage medium, the exporting comprising at least one of:
generating a resource based on a context-free info item of the third data set;
generating a resource based on a delta item of the third data set, and associating a second resource based on a reference to an info item; and
generating an association based on a context item of the third data set, and mapping a property type of the context item to a role.

2. The method of claim 1, further comprising providing a property specification associated with the source info item, the property specification comprising an indication of the source info item, an indication of a target info item, and the property type.

3. The method of claim 1, further comprising at least one of:
setting the property type in the third data set equal to a predicate of the first data set when an object of the first data set comprises a value; and
generating a second delta item when the object comprises a resource, wherein the second delta item includes a context-based modification that is set equal to the predicate.

4. The method of claim 1, further comprising:
generating a second source info item based on a topic of the first data set;
generating a context item based on an association of the first data set; and
providing a property of the context item based on a role of the association.

5. The method of claim 1, further comprising:
providing a list of types of an entity of the first data set;
generating a second source info item that includes properties of the entity, the properties including common properties;
generating a second delta item that includes a property equal to a non-common property of the entity; and
generating a context item that includes a property equal to a null property of the entity.

6. The method of claim 1, wherein the first format includes one of a resource description framework (RDF) format, a topic map format, and a freebase data format.

7. A non-transitory computer-readable storage medium coupled to one or more processors having instructions stored thereon which, when executed by the one or more processors, cause the one or more processors to perform operations comprising:
receiving a first data set provided in a first format corresponding to a first data model; and
processing the first data set to generate a second data set provided in a second format corresponding to a second data model, the first data model being incompatible with the second data model, wherein processing the first data set comprises:
transforming the first data set to a third data set provided in a third format corresponding to a unified data model, the third format comprising a quadruple schema including subject, context, predicate and object, the unified data model comprising source info items, target info items, delta items and context items, transforming comprising:
generating a source info item based on the first data set, the source info item representing an entity extracted from the first data set, the source info item associated with two or more attributes;
generating a delta item based on the first data set, the delta item including a reference to the source info item and a context-based modification of the source info item;
performing the context-based modification of the source info item;
in response to performing the context-based modification, setting a property type of the source info item to point to the delta item, wherein the delta item is associated with a subset of the attributes; and
storing the third data set to the computer-readable storage medium, and
generating the second data set based on the third data set by exporting the third data set from the computer-readable storage medium, the exporting comprising at least one of:
generating a resource based on a context-free info item of the third data set;
generating a resource based on a delta item of the third data set, and associating a second resource based on a reference to an info item; and
generating an association based on a context item of the third data set, and mapping a property type of the context item to a role.

8. The storage medium of claim 7, wherein the operations further comprise providing a property specification associated with the source info item, the property specification comprising an indication of the source info item, an indication of a target info item, and the property type.

9. The storage medium of claim 7, wherein the operations further comprise at least one of:

setting the property type in the third data set equal to a predicate of the first data set when an object of the first data set comprises a value; and generating a second delta item when the object comprises a resource, wherein the second delta item includes a context-based modification that is set equal to the predicate.

10. The storage medium of claim 7, wherein the operations further comprise:

generating a second source info item based on a topic of the first data set;

generating a context item based on an association of the first data set; and providing a property of the context item based on a role of the association.

11. The storage medium of claim 7, wherein the operations further comprise:

providing a list of types of an entity of the first data set;

generating a second source info item that includes properties of the entity, the properties including common properties;

generating a second delta item that includes a property equal to a non-common property of the entity; and generating a context item that includes a property equal to a null property of the entity.

12. The storage medium of claim 7, wherein the first format includes one of a resource description framework (RDF) format, a topic map format, and a freebase data format.

13. A system for importing data to a computer-readable storage medium, comprising:

one or more processors in communication with the computer-readable storage medium, the storage medium having instructions stored thereon which, when executed by the one or more processors, cause the one or more processors to perform operations comprising:

receiving a first data set provided in a first format corresponding to a first data model; and processing the first data set to generate a second data set provided in a second format corresponding to a second data model, the first data model being incompatible with the second data model, wherein processing the first data set comprises:

transforming the first data set to a third data set provided in a third format corresponding to a unified data model, the third format comprising a quadruple schema including subject, context, predicate and object, the unified data model comprising source info items, target info items, delta items and context items, transforming comprising:

generating a source info item based on the first data set, the source info item representing an entity extracted from the first data set, the source info item associated with two or more attributes;

generating a delta item based on the first data set and the target info item, the delta item including a reference to the source info item and a context-based modification of the source info item;

performing the context-based modification of the source info item;

in response to performing the context-based modification, setting a property type of the source info item to point to the delta item, wherein the delta item is associated with a subset of the attributes; and storing the third data set to the computer-readable storage medium; and generating the second data set based on the third data set by exporting the third data set from the computer-readable storage medium, the exporting comprising at least one of:

generating a resource based on a context-free info item of the third data set;

generating a resource based on a delta item of the third data set, and associating a second resource based on a reference to an info item; and generating an association based on a context item of the third data set, and mapping a property type of the context item to a role.

14. The system of claim 13, wherein the operations further comprise providing a property specification associated with the source info item, the property specification comprising an indication of the source info item, an indication of a target info item, and the property type.

15. The system of claim 13, wherein the operations further comprise at least one of:

setting the property type in the third data set equal to a predicate of the first data set when an object of the first data set comprises a value; and generating a second delta item when the object comprises a resource, wherein the second delta item includes a context-based modification that is set equal to the predicate.

16. The system of claim 13, wherein the operations further comprise:

generating a second source info item based on a topic of the first data set;

generating a context item based on an association of the first data set; and providing a property of the context item based on a role of the association.

17. The system of claim 13, wherein the operations further comprise:

providing a list of types of an entity of the first data set;

generating a second source info item that includes properties of the entity, the properties including common properties;

generating a second delta item that includes a property equal to a non-common property of the entity; and generating a context item that includes a property equal to a null property of the entity.

* * * * *